(12) United States Patent
Maine et al.

(10) Patent No.: US 12,259,063 B2
(45) Date of Patent: Mar. 25, 2025

(54) VALVE APPARATUS

(71) Applicants: Jason Maine, Hamlin, NY (US); Jason Patti, Rochester, NY (US)

(72) Inventors: Jason Maine, Hamlin, NY (US); Jason Patti, Rochester, NY (US)

(73) Assignee: AMGIS, LLC, Medina, NY (US)

( * ) Notice: Subject to any disclaimer, the term of this patent is extended or adjusted under 35 U.S.C. 154(b) by 0 days.

(21) Appl. No.: 17/657,505

(22) Filed: Mar. 31, 2022

(65) Prior Publication Data

US 2022/0316605 A1 Oct. 6, 2022

Related U.S. Application Data

(60) Provisional application No. 63/168,587, filed on Mar. 31, 2021.

(51) Int. Cl.
*F16K 5/04* (2006.01)
*F16K 5/12* (2006.01)

(52) U.S. Cl.
CPC .............. *F16K 5/0407* (2013.01); *F16K 5/12* (2013.01)

(58) Field of Classification Search
CPC .... F16K 5/0207; F16K 5/0407; F16K 5/0605; F16K 5/10; F16K 5/12; F16K 5/08
See application file for complete search history.

(56) References Cited

U.S. PATENT DOCUMENTS

| | | | | |
|---|---|---|---|---|
| 2,902,253 A | * | 9/1959 | Page | F16K 5/0207 251/209 |
| 3,528,448 A | * | 9/1970 | Urban | F16K 5/0642 251/173 |
| 3,684,241 A | * | 8/1972 | Hartmann | F16K 5/08 137/625.22 |
| 4,881,718 A | * | 11/1989 | Champagne | F16K 5/0605 251/316 |
| 5,524,863 A | * | 6/1996 | Davis | B08B 9/00 251/127 |

(Continued)

FOREIGN PATENT DOCUMENTS

| | | | | |
|---|---|---|---|---|
| KR | 20130142798 A | * | 12/2013 | ............ F16K 31/60 |
| WO | WO-2013079697 A1 | * | 6/2013 | ............... F16K 5/06 |

OTHER PUBLICATIONS

Machine English translation of WO-2013079697-A1 (Year: 2022).*

*Primary Examiner* — Hailey K. Do
(74) *Attorney, Agent, or Firm* — Simpson & Simpson, PLLC

(57) ABSTRACT

An improved stopcock valve, including a valve body, the valve body having at least one inlet port and at least one outlet port, the valve body having an internal cavity in communication with the at least one inlet port and the at least one outlet port and, a rotatable interference body having a through-bore therein, the rotatable body having an external surface, the through-bore having a first opening to the surface and a second opening to the surface, the interference body positioned within the internal cavity of the valve body, the external surface including a first tapered groove in communication with the first opening and a second tapered groove in communication with the second opening, the grooves arranged to be in communication with the at least one inlet port and the at least one outlet port upon rotation of the body.

19 Claims, 9 Drawing Sheets

(56) References Cited

U.S. PATENT DOCUMENTS

| | | | | |
|---|---|---|---|---|
| 6,012,702 | A * | 1/2000 | Heimberger | F16K 27/062 |
| | | | | 137/240 |
| 6,808,162 | B2 * | 10/2004 | Tranovich | F16K 5/0407 |
| | | | | 251/283 |
| 10,301,050 | B2 * | 5/2019 | Donati | B65B 55/106 |
| 2003/0205685 | A1 * | 11/2003 | Whang | F16K 5/10 |
| | | | | 251/315.16 |
| 2016/0166742 | A1 | 6/2016 | Layser et al. | |
| 2021/0219826 | A1 * | 7/2021 | Schwendele | F16K 5/0242 |

* cited by examiner

VALVE APPARATUS

CROSS-REFERENCE TO RELATED APPLICATIONS

This application is a U.S. Nonprovisional Patent Application filed pursuant to 35 U.S.C. § 111, which application claims priority to U.S. Provisional Patent Application No. 63/168,587, filed Mar. 31, 2021.

FIELD OF THE INVENTION

The present invention generally relates to a valve structure that is preferably designed for medical infusion devices to control a flow of a fluid pass therethrough.

BACKGROUND

Infusion devices are well known in the art and encompass a plurality of variations, designs, and methods of administering and controlling a selected fluid flow to a patient. In some designs, a single camera system is utilized to capture a liquid drop passing through a drip chamber wherein a captured image of the drop is processed to determine individual drop size, drop growth, and drop volume. The combination of these measurements affords an on-board computer to process and calculate a flow rate.

Another issue with these devices is the precision of the valve structure which controls the flow of a fluid from an IV bag to a patient. Traditional stop-cock valves are well known in the art but do not offer the precision needed to minutely adjust flowrate for the particular therapeutic, drug, fluid, or the like, administered by an infusion device.

There is also a long-felt need for a specialty flow-valve that has a structural configuration that provides for acute fluid flow control to a liquid flow therethrough.

SUMMARY

The invention also generally comprises an improved stopcock valve, comprising, a valve body, the valve body having at least one inlet port and at least one outlet port, the valve body having an internal cavity in communication with the at least one inlet port and the at least one outlet port, and, a rotatable interference body having a through-bore therein, the rotatable body having an external surface, the through-bore having a first opening to the surface and a second opening to the surface, said interference body positioned within the internal cavity of the valve body, the external surface including a first tapered groove in communication with the first opening and a second tapered groove in communication with the second opening, the grooves arranged to be in communication with the at least one inlet port and the at least one outlet port upon rotation of the body, wherein the body is arranged to be rotated to occlude fluid flow through the valve or to adjustably regulate fluid flow through the valve via the through-bore.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION OF THE DRAWINGS

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims.

It should also be appreciated that the terms "liquid" and "fluid" may be used interchangeably and are both describing a substance that is moving through the present invention. Liquid or fluid may comprise water, saline, a pharmaceutical substance, a combination thereof, or any other liquid or fluid type that one having ordinary skill in the art of medical devices, medical administration, medical treatment, diagnosis, and the like, would readily recognize as usable within an infusion device. However, it should also be appreciated that present invention is not restricted to medical infusion device use, that is, it may be used in a plurality of applications where precise fluid control between two bodies, i.e., containers, is needed.

Figure 1:
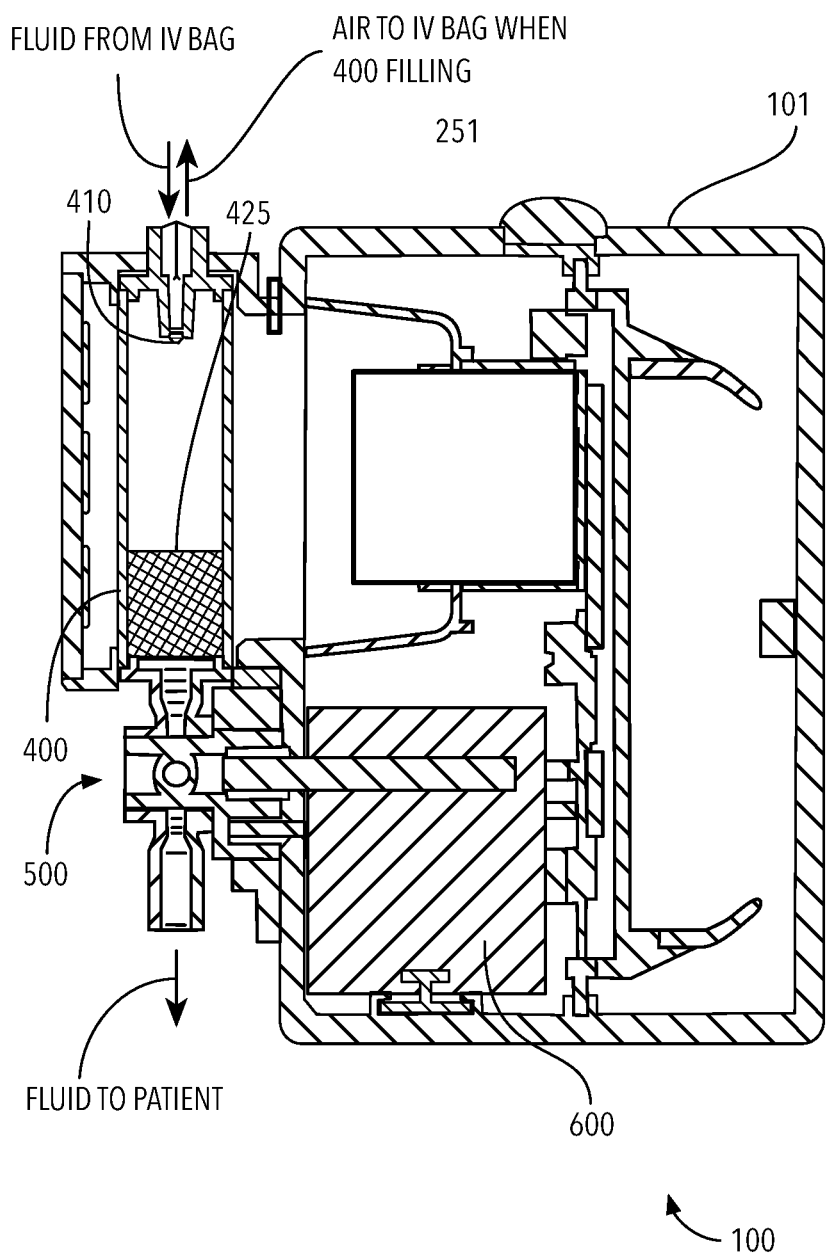
FIG. 1 illustrates a cross-sectional view of an infusion device which includes the valve apparatus of the invention.
Figure 2A:
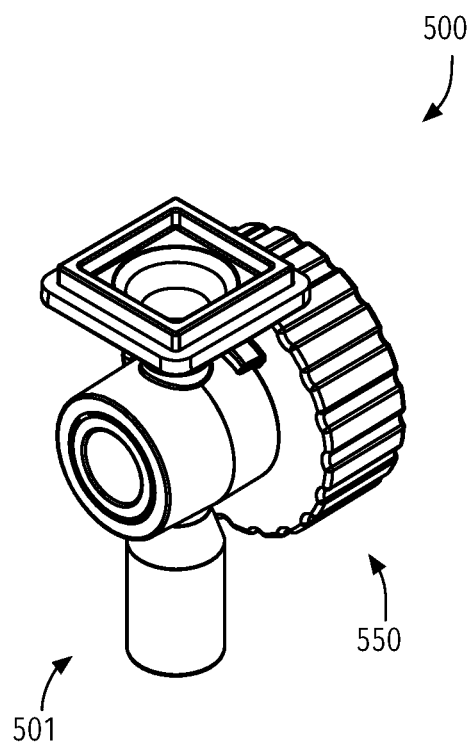
FIG. 2A illustrates a perspective view of valve apparatus 500.
Figure 2B:
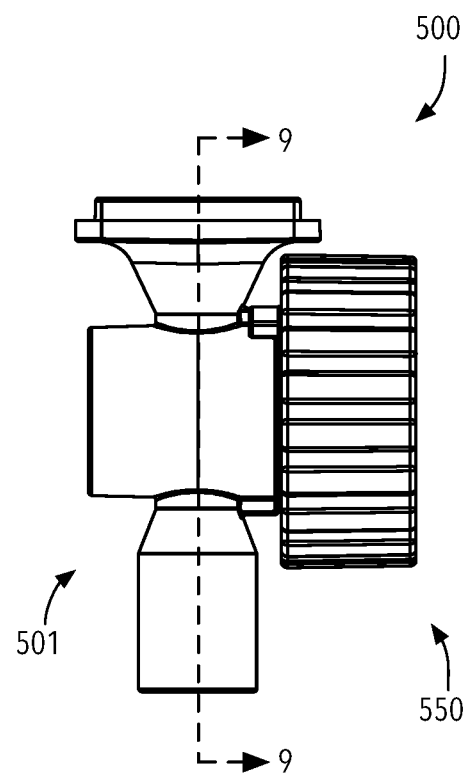
FIG. 2B illustrates a right-side view of valve apparatus 500.
Figure 2C:
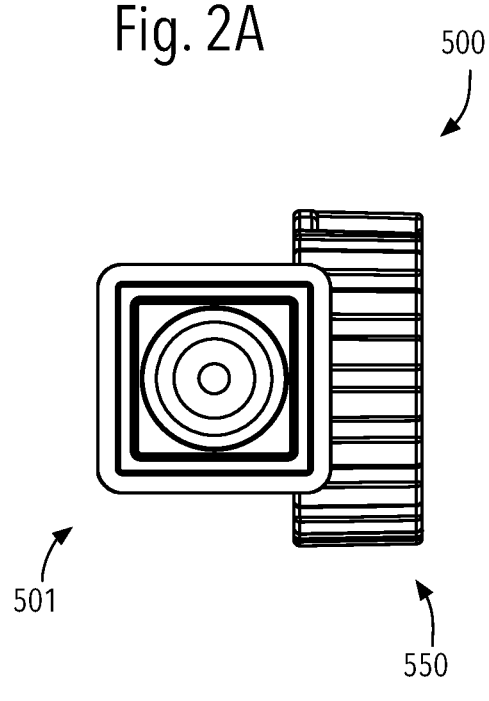
FIG. 2C illustrates a top plan view of valve apparatus 500.
Figure 2D:
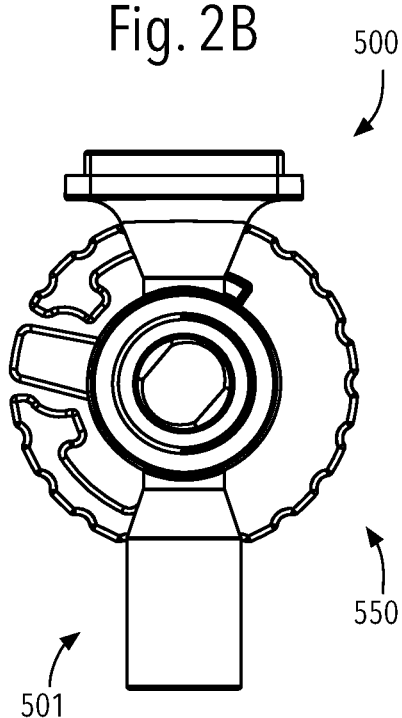
FIG. 2D illustrates a front view of valve apparatus 500.

Adverting now to the Figures, FIG. 1 illustrates a cross-sectional view of a representative infusion device 100. Infusion device 100 has case 101 which houses drip chamber 400. Drip chamber 400 is arranged to receive fluid from an IV bag attached at the upper portion of drip chamber 400. Fluid 425 collects from drop former 410 into the distal end of drip chamber 400. Fluid 425 is a pool of fluid that collects from individual fluid drops. In fluid connection with drip chamber 400, arranged at its distal end, is specialty valve apparatus 500 which controls the flowrate fluid 425 will be delivered to a patient in fluid connection with the distal end of specialty valve apparatus 500. Specialty valve apparatus 500 is preferably driven by a motor shaft of motor 600, which in a preferred embodiment will actuate specialty valve apparatus 500 according to a programmed protocol that corresponds to a selected fluid and/or substance that is arranged to be delivered to a patient.

FIGS. 2A-9D, described infra, generally illustrate the specialty valve component of an infusion device. At the outset, specialty valve apparatus 500 is a fluid and/or liquid flow control mechanism for infusion device 100. Specialty valve apparatus 500 is driven by a motor (shown in FIG. 1) according to a programmable protocol that is communicated from a control system, in response to a selected user input, i.e., a selection of a certain drug, liquid, fluid protocol that is inputted into infusion device 100. The actuation of specialty valve apparatus 500 by the motor is further controlled by the control system such that actuation of specialty valve apparatus 500 alters in response to calculations determined by the control system.

The following description should be taken in view of FIGS. 2A-2D. The specialty valve apparatus 500 generally comprises specialty valve body 501 and specialty valve 550. Specialty valve body 501 is arranged to accept specialty valve 550 within, where, in a preferred embodiment, snap-fit elements on both specialty valve body 501 and specialty valve 550 interact and rotatably secure specialty valve 550 within specialty valve body 501. Specialty valve 550 has a rotatable interference body, flow control portion 552 (shown in FIG. 3), arranged within specialty valve body 501 such that rotation of valve 500 will either completely hinder a liquid flow through specialty valve apparatus 500, decrease or increase a liquid flow through specialty valve apparatus 500, or provide nominal, or no interference to a liquid flow through specialty valve apparatus 500. These positions are described in greater detail in view of FIGS. 9A-9D, infra.

Figure 3:
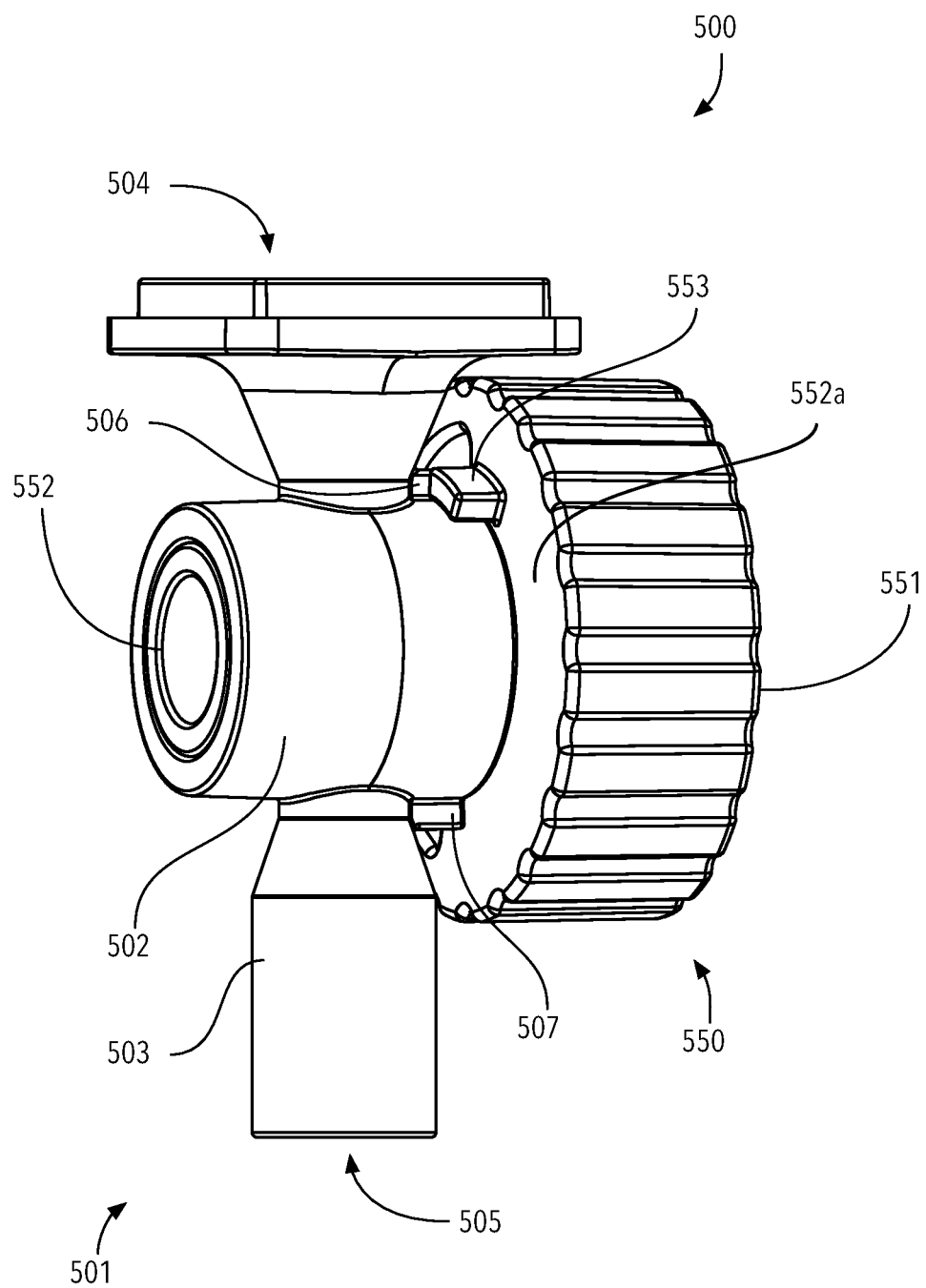
FIG. 3 illustrates an alternative perspective view of valve apparatus 500.

FIG. 3 illustrates an alternative perspective view of specialty valve apparatus 500. Specialty valve body 501 includes valve housing 502 which is arranged to rotatably secure specialty valve 550 therein, specifically flow control portion 552 of specialty valve 550. Specialty valve body 501 also includes flow body 503 which is defined by in-flow end 504 and outflow end 505, whereas valve housing 502 is arranged in between in-flow end 504 and outflow end 505.

In a preferred embodiment, valve housing 502 is arranged such that it is positioned more proximate to in-flow end 504 than outflow end 505.

Specialty valve 550 generally comprises rotation-control portion 551 and flow control portion 552. In a preferred embodiment, rotation-control portion 551 and flow control portion 552 are integral, however it may be contemplated that rotation-control portion 551 and flow control portion 552 may be two separate components that are fixedly secured to one another, e.g., snap-fit, or threading.

FIG. 3 also illustrates rotation-control members 506 and 507 of specialty valve apparatus 500. The rotation-control members prevent specialty valve 550 from over-rotating within specialty valve body 501, that is, specialty valve 550 may only rotate between the rotation-control members of specialty valve body 501. Specialty valve body 501 has two rotation-control members, upper rotation-control member 506 and distal rotation-control member 507. Upper rotation-control member 506 is fixedly secured to the outside surface of valve housing 502, proximate in-flow end 504, and proximate rotation-control portion 551 of specialty valve 550. Distal rotation-control member 507 is fixedly secured to the outside surface of valve housing 502, proximate outflow end 505, and proximate rotation-control portion 551 of specialty valve 550. Specialty valve 550 also includes rotation-control member 553. Rotation-control member 553 is preferably arranged on distal face 551a of rotation-control portion 551 of specialty valve 550. When specialty valve 550 is properly engaged within specialty valve body 501, rotation-control member 553 will be positioned in between upper rotation-control member 506 and distal rotation-control member 507. In a preferred embodiment, the amount of rotation that specialty valve 550 will be afforded before rotation-control member 553 will contact either upper rotation-control member 506 or distal rotation-control member 507 is less than approximately 180 degrees.

Figure 4A:
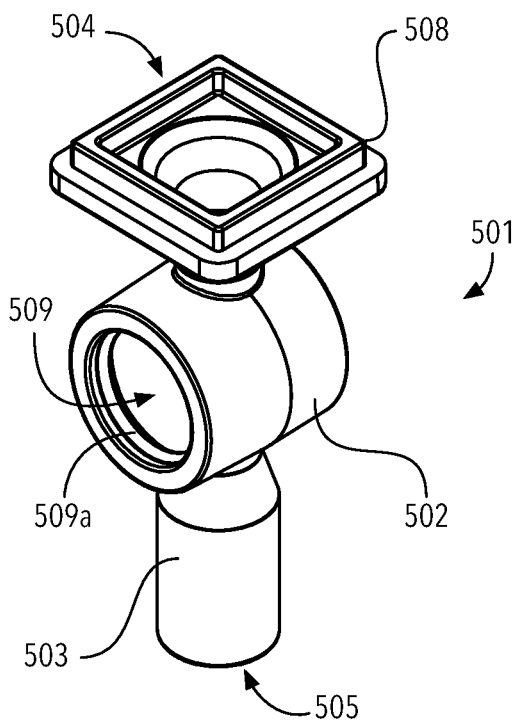
FIG. 4A illustrates a perspective view of valve body 501.
Figure 4B:
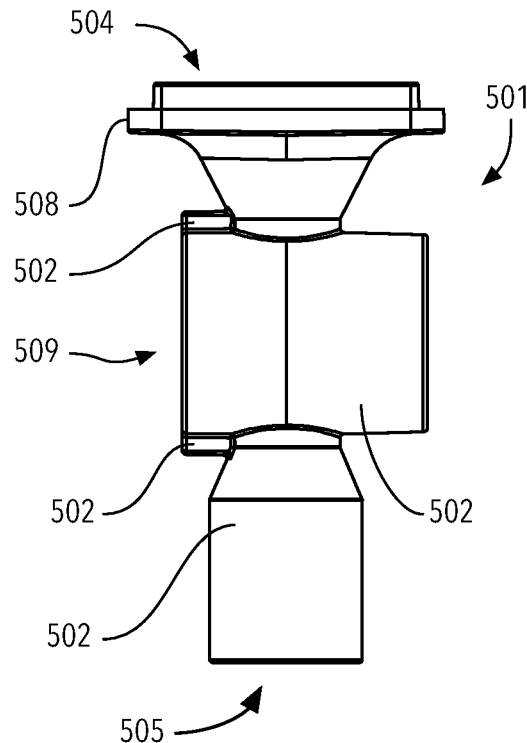
FIG. 4B illustrates a left-side view of valve body 501.
Figure 4C:
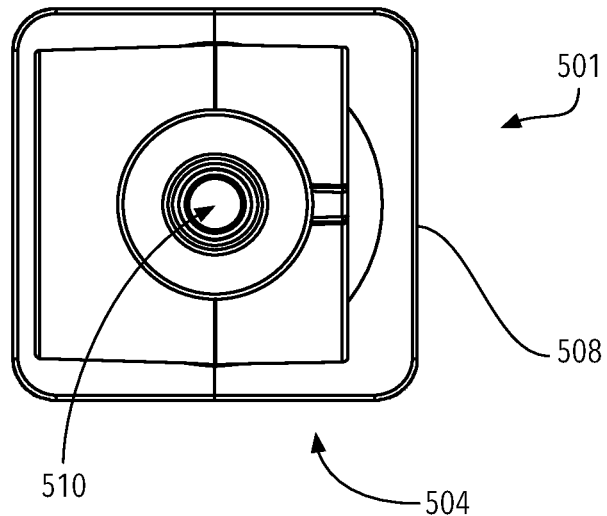
FIG. 4C illustrates a top plan view of valve body 501.

The following description should be taken in view of FIGS. 4A-4C, which illustrate various views of specialty valve body 501 without specialty valve 550 inserted therein. Flow control portion 552 of specialty valve 550, as shown in the aforementioned figures, is arranged to snap-fit within valve aperture 509. Flow control portion 552 of specialty valve 550 includes attachment means (shown and described, infra) that are arranged to interact with valve attachment means 509a via snap-fit, e.g., tongue and groove, or other known in the art snap-fit attachment means, to secure flow control portion 552 within valve aperture 509, as shown in FIG. 6. Arranged proximate and defining in-flow end 504 of flow body 503 is attachment body 508. Attachment body 508 is arranged to mate with the distal end of a drip chamber of an infusion device, allowing flow from the drip chamber to enter upper flow pathway 510. Upper flow pathway 510 is arranged above valve housing 502 and proximate in-flow end 504, that is, upper flow pathway begins at in-flow end 504 and terminates at its opening to valve housing 502. The specific arrangement of upper flow pathway 510 is described in further detail, infra.

Figure 5A:
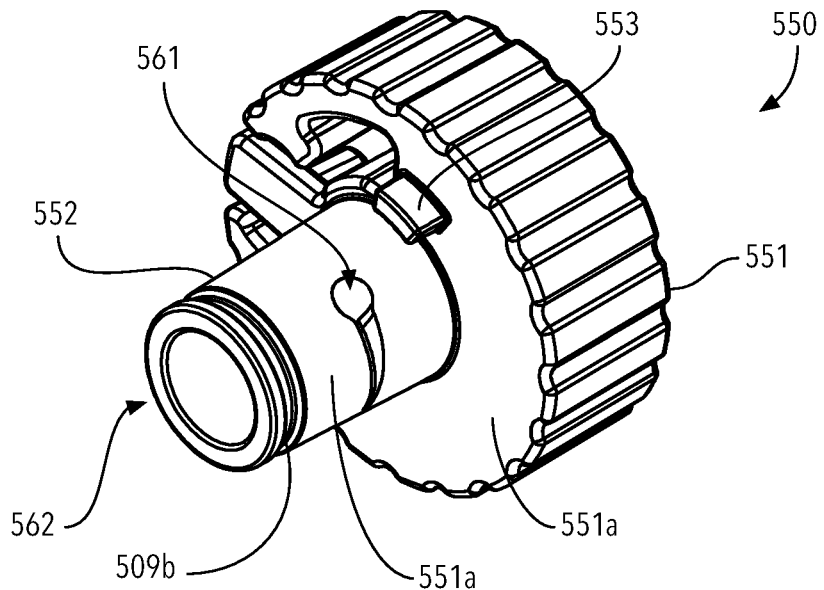
FIG. 5A illustrates a perspective view of valve 550.
Figure 5B:
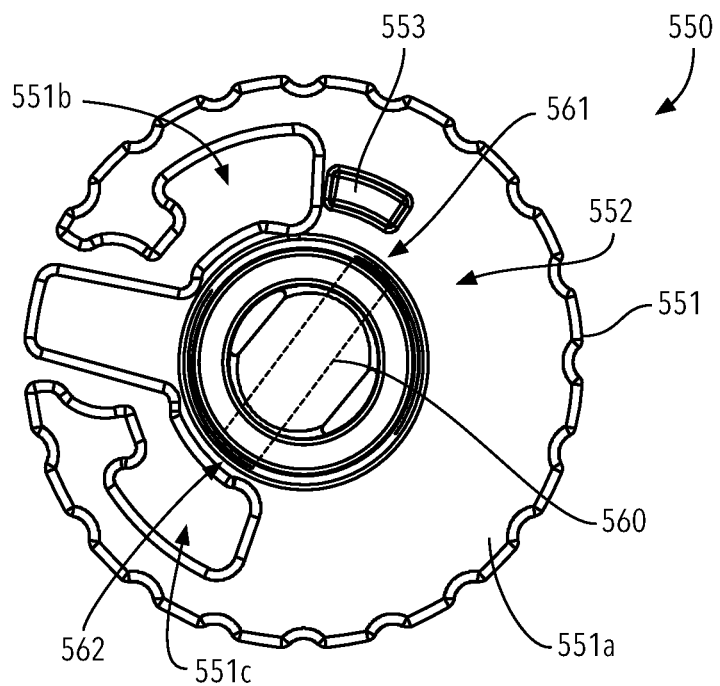
FIG. 5B illustrates a front view of valve 550.

The following description should be taken in view of FIGS. 5A and 5B which illustrate a perspective view and a front view of specialty valve 550, respectively. Extending from distal surface 551a of rotation-control portion 551 of specialty valve 550 is flow control portion 552. Arranged on outer surface 552a of flow control portion 552 of specialty valve 550 is valve attachment means 509b of flow control portion 552. Valve attachment means 509b are arranged to mate, engage, etc., with valve attachment means 509a of valve aperture 509 (shown in FIG. 4A) via snap-fit, e.g., tongue and groove, or other known in the art snap-fit attachment means, to secure flow control portion 552 within valve aperture 509, as shown in FIG. 3. Also arranged on outer surface 552a of flow control portion 552 is first opening 561 of medial flow pathway 560, whereas second opening 562 (shown in FIG. 6D), is arranged on an opposite side of outer surface 552a of flow control portion 552. Medial flow pathway 560 is a channel, tube, or the like, that is arranged to connect upper flow pathway 506 (shown in FIG. 9A) and distal flow pathway 507 (shown in FIG. 9A), when specialty valve 550 is rotated within valve aperture 509 at a particular angle.

Shown in FIG. 5B are first space 551b and second space 551c, arranged within rotation-control portion 551. First space 551b and second space 551c are voids, spaces, gaps, within rotation-control portion 551 and arranged to accept a motor shaft end member therein. First space 551b and second space 551c allow an engaged motor shaft end member impart force onto the outside surfaces of first space 551b and second space 551c to rotate valve 550 (illustrated in various positions in FIGS. 9A-9D), thereby altering the position of first opening 561 and second opening 562 of medial flow pathway 560 (illustrated in hidden lines in FIG. 5B) to control the flow of a liquid therethrough. It should be noted that the central through-bore, where medial flow pathway 560 is arranged, may also be used as an engagement location for a motor shaft to engage specialty valve 550 for actuation.

It should also be appreciated that rotation-control portion 551 may alternatively take the form of a lever body, like a stock-cock or gate valve. Rotation-control portion 551 may alternatively take the form of a handle, crutch head, or the like, where flow control portion 552 would extend therefrom. These alternative embodiments of rotation-control portion 551 would allow for manual rotation of valve 550 for alternative applications of valve 550.

Figure 6A:
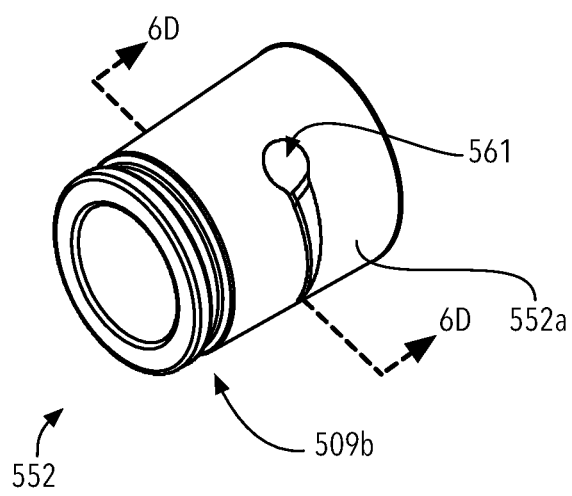
FIG. 6A illustrates a perspective view of flow control portion 552 of valve 550.
Figure 6B:
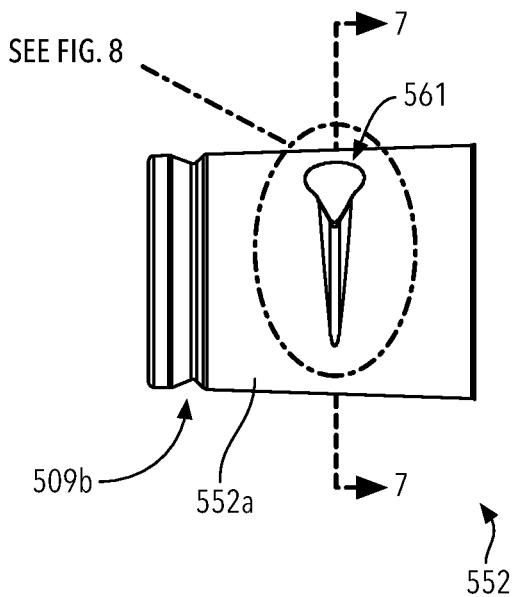
FIG. 6B illustrates a right-side view of flow control portion 552 of valve 550.
Figure 6C:
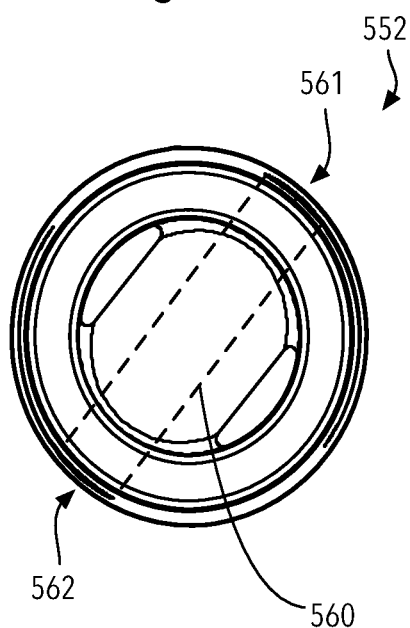
FIG. 6C illustrates a front view of flow control portion 552 of valve 550.
Figure 6D:
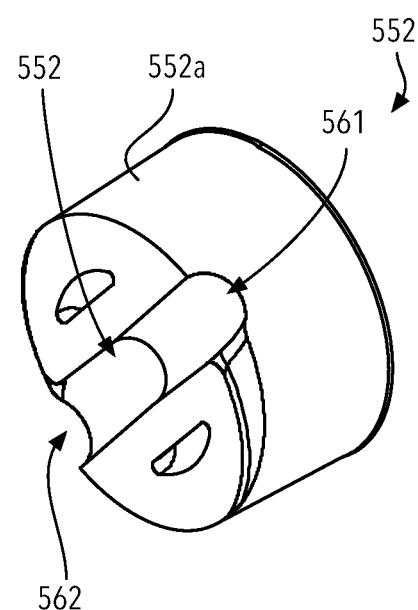
FIG. 6D is a perspective cross-sectional view of flow control portion 552 of valve 550 taken along lines 6D-6D in FIG. 6A.

The following description should be taken in view of FIGS. 6A-6D. FIGS. 6A through 6C illustrate flow control portion 552 removed from specialty valve 550 and FIG. 6D is a cross-sectional view of flow control portion 552 taken along lines 6D-6D shown in FIG. 6A. Medial flow pathway 560 intersects a substantially central portion of flow control portion 552, best shown in FIGS. 6C and 6D. Medial flow pathway 560 includes two oppositely arranged openings, first opening 561 and second opening 562.

Figure 7:
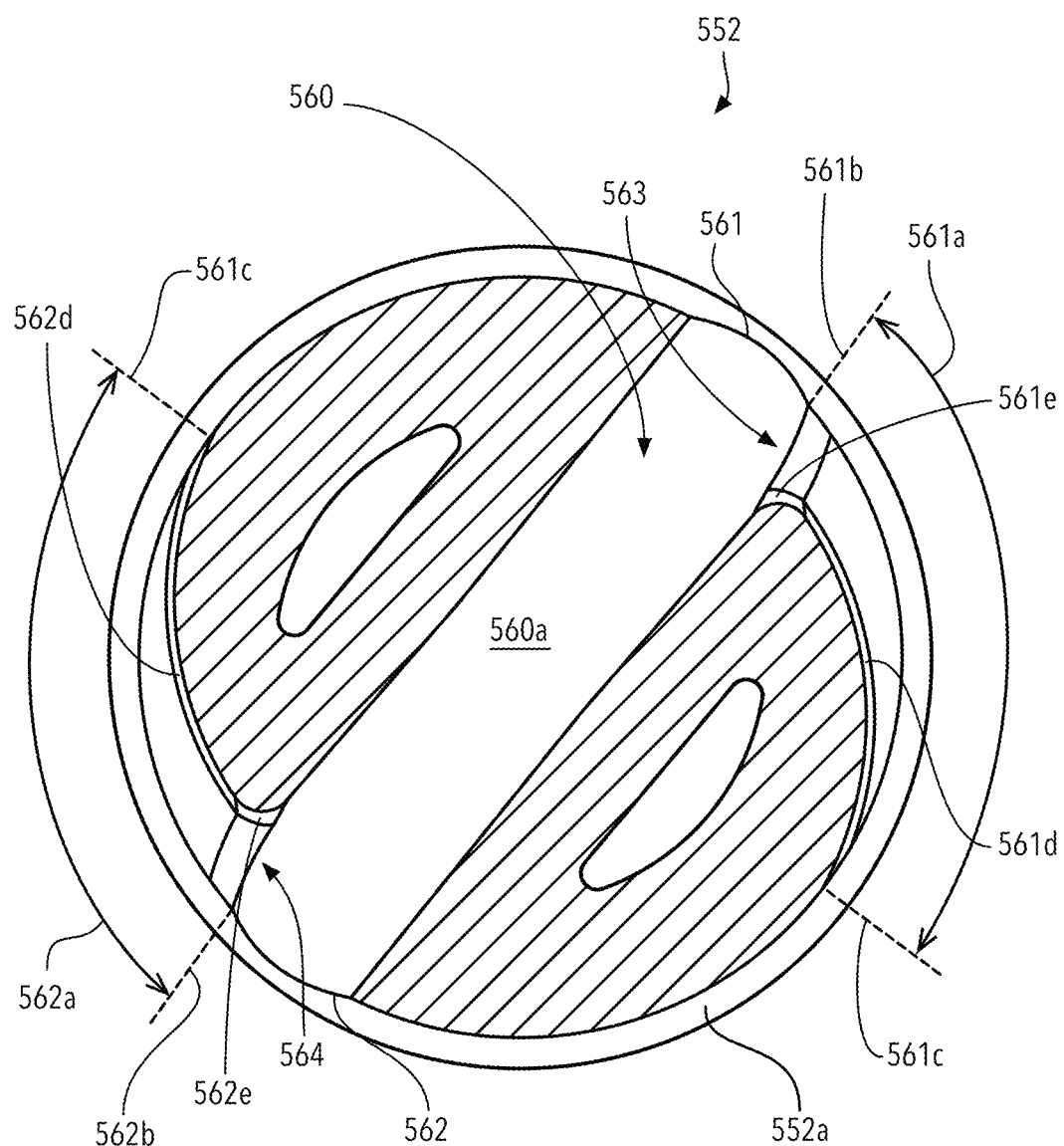
FIG. 7 is a cross-sectional view of flow control portion 552 of valve 550 taken along lines 7-7 in FIG. 6B.

FIG. 7 illustrates a cross sectional view of flow control portion 552 taken along lines 7-7 shown in FIG. 6B. First opening 561 and second opening 562 of flow control portion 552 comprise tapered grooves extending from each respective opening, first tapered groove 561a and second tapered groove 562a. First tapered groove 561a extends from first groove opening 561b at first groove end 561b and terminates at first groove tip 561c. First tapered groove 561a opens on outer surface 552a of flow control portion 552 and terminates at first groove floor 561d and first groove opening 561e. First tapered groove 561a merges into medial flow pathway 560 at first groove opening 561e-allowing first tapered groove 561a to be in flow-communication, i.e., liquid communication of a liquid with first tapered groove 561a and medial flow pathway 560. Second tapered groove 562a extends from second opening 562 at second groove end 562b and terminates at second groove tip 562c. Second tapered groove 562a opens on outer surface 552a of flow control portion 552 and terminates at second groove floor 562d and second groove opening 562e. Second tapered groove 562a merges into medial flow pathway 560 at second groove opening 562e-allowing second tapered groove 562a to be in flow-communication, i.e., liquid communication of a liquid with second tapered groove 562a and medial flow pathway 560.

Figure 8:
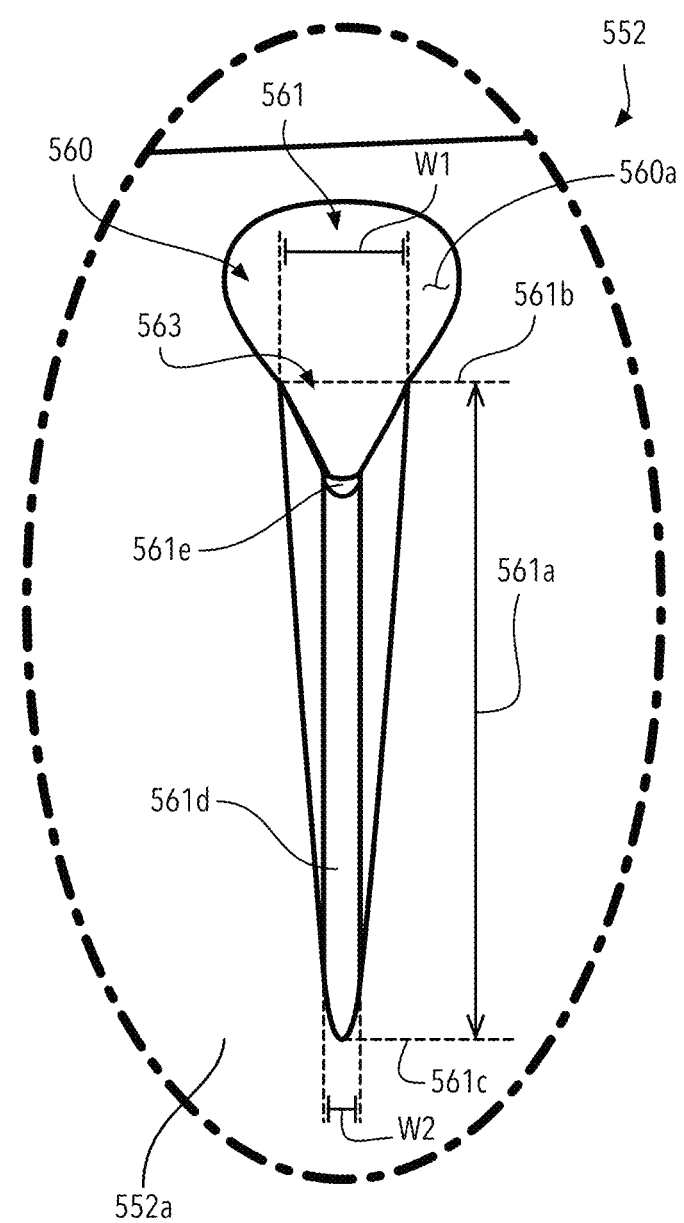
FIG. 8 is a focused view of flow control portion 552 of valve 550 taken from FIG. 6B.

The following description should be taken in view of FIGS. 7 and 8. The following description describes first opening 561 and first tapered groove 561a and applies to second opening 562 and second tapered groove 562a. FIG. 8 shows a focused view of flow control portion 552 taken from FIG. 6B. As described supra, first tapered groove 561a extends from first groove end 561b and terminates at first groove tip 561c. First tapered groove 561a is defined by a varying depth and width. The depth of first groove end 561b, that is, the distance from outer surface 552a to first groove opening 561e, is greater than the depth of first groove tip 561c, that is, the distance from outer surface 552a to the terminating end proximate first groove tip 561 of first groove floor 561d. The depth of first taper groove 561a gradually decreases from first groove end 561b to first groove tip 561c. First groove floor 561d is arranged to terminate when it reaches first groove tip 561c, which is arranged to be flush with outer surface 552a. First groove opening 561b has a width W1 that is greater than the width W2 of first tapered groove 561a that is proximate first groove tip 561. The width of first tapered groove 561a gradually decreases from first groove end 561b to first groove tip 561c, where first tapered groove 561a terminates, i.e., has no width, at first groove tip 561c. Notably, and best shown in FIG. 8, first groove opening 561e of first opening 561 of medial flow pathway 560 is defined by substantially V-shaped opening 563, which V-shaped opening merges into inner surface 560a of medial flow pathway 560 and the bottom portion of the "V" further curves in a direction towards second opening 562 of medial flow pathway 560, generally illustrated in FIG. 7. Similarly, second groove opening 562e of second opening 562 of medial flow pathway 560 is defined by substantially V-shaped opening 564, which V-shaped opening merges into inner surface 560a of medial flow pathway 560 and the bottom portion of the "V" further curves in a direction towards first opening 561 of medial flow pathway 560, generally illustrated in FIG. 7.

The following description should be taken in view of FIGS. 9A through 9D which illustrate various positions flow control portion 552 of valve 550 may rotate within valve body 501. It should be appreciated that the positions of flow control portion 552 are merely exemplary, and flow control portion 552 may be rotated in much finer increments to accommodate a particular flow rate of a liquid from upper flow pathway 510 through medial flow pathway 560 to distal flow pathway 511 to then exit distal flow pathway 511 at its respective opening proximate outflow end 505 of valve body 501.

Figure 9A:
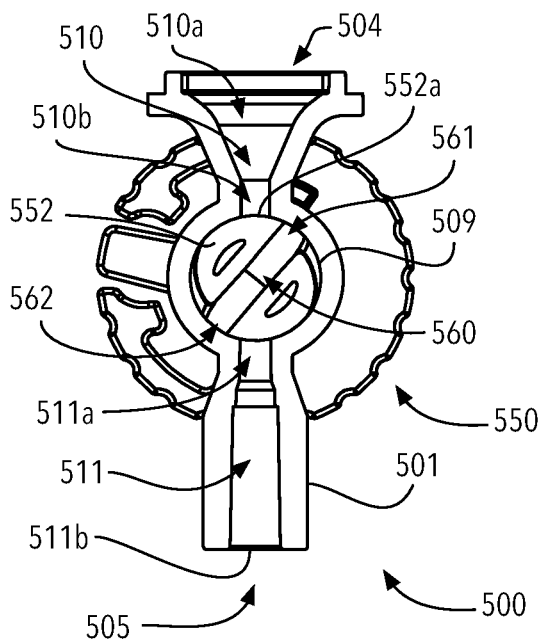
FIG. 9A illustrates a cross-sectional view of valve apparatus 500 taken generally along line 9-9 in FIG. 2B.

FIG. 9A illustrates a closed position of valve apparatus 500, that is, there is no liquid flow from upper flow pathway 510 through medial flow pathway 560 to distal flow pathway 511. Specifically, outer surface 552a of flow control portion 552 of valve 500 is scaling second opening 510b of upper flow pathway 510 and first opening 511a of distal flow pathway 511.

Figure 9B:
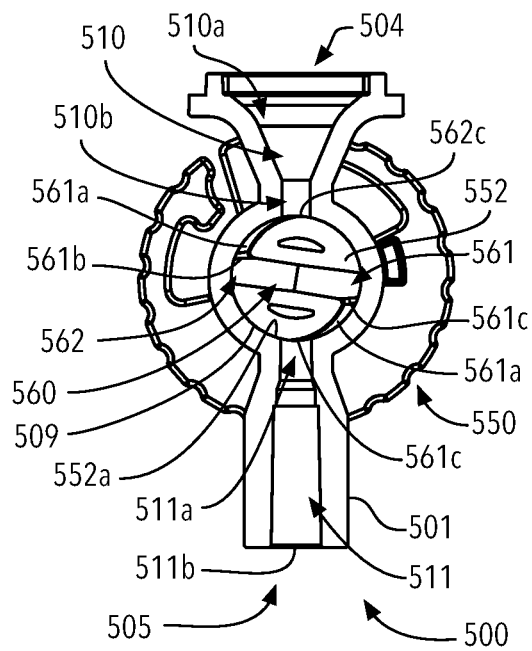
FIG. 9B illustrates a cross-sectional view of valve apparatus 500 taken generally along line 9-9 in FIG. 2B, showing the valve rotated with respect to its position in FIG. 9A.

FIG. 9B illustrates a partially opened position of valve apparatus 500, that is, there is a minimal flow from upper flow pathway 510 through medial flow pathway 560 to distal flow pathway 511. In the partially opened position, liquid may flow into first opening 510a of upper flow pathway 510 and through second opening 510b of upper flow pathway 510 into second tapered groove 262a. Specifically, liquid flows into an area of second tapered groove 262a proximate second groove tip 562c, where the liquid will enter medial flow pathway 560 through second groove opening 562b. Liquid will then travel in a direction within medial flow pathway 560 towards first opening 561 where the liquid will enter distal flow pathway 511 at first opening 511a and exit distal flow pathway 511 from second opening 511b. Specifically, liquid exits medial flow pathway 560 via first opening 561b of first tapered groove 561a and travels towards first groove tip 561a where the liquid will enter distal flow pathway 511 at first opening 511a.

Figure 9C:
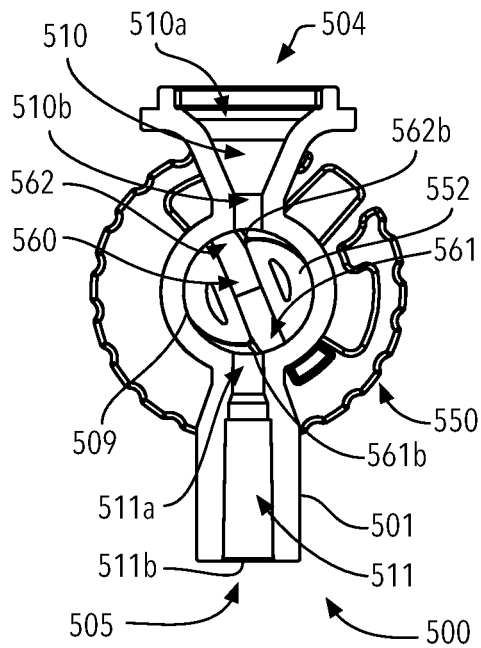
FIG. 9C illustrates a cross-sectional view taken generally along line 9-9 in FIG. 2B, showing the valve rotated with respect to its position in FIG. 9B; and, FIG. 9D illustrates a cross-sectional view taken generally along line 9-9 in FIG. 2B, showing the valve rotated with respect to its position in FIG. 9C.

FIG. 9C illustrates a substantially opened position of valve apparatus 500, that is, there is a moderate liquid flow from upper flow pathway 510 through medial flow pathway 560 to distal flow pathway 511. In the substantially opened position, liquid may flow into first opening 510a of upper flow pathway 510 and through second opening 510b of upper flow pathway 510 into second tapered groove 562a second opening 562 of medial pathway. Specifically, liquid flows into an area partially including second tapered groove 562a proximate second groove end 562b and partially-directly into medial flow pathway 560. Liquid will then travel in a direction within medial flow pathway 560 towards first opening 561 where the liquid will enter distal flow pathway 511 at first opening 511a and exit distal flow pathway 511 from second opening 511b. Specifically, liquid exits medial flow pathway 560 partially via first opening 561b of first tapered groove 561a and partially through first groove opening 561b where the liquid will enter distal flow pathway 511 at first opening 511a.

Figure 9D:
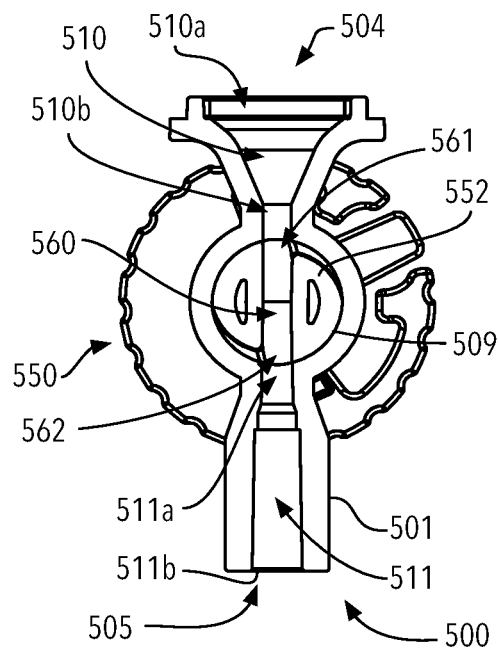

FIG. 9D illustrates a fully opened position of valve apparatus 500, that is, the arrangement shown in FIG. 9D affords the maximum liquid flow from upper flow pathway 510 through medial flow pathway 560 to distal flow pathway 511, as these respective flow pathways are all aligned without restriction, as shown in FIG. 9D.

It should be appreciated that the inside surface of valve aperture 509 and either first tapered groove 561a or second tapered groove 562b forms a sealed tunnel such that liquid flowing through flow control portion 522 to either first opening 561 or second opening 562, will not escape.

Thus, it is seen that the objects of the invention are efficiently obtained, although modifications and changes to the invention may be readily imagined by those having ordinary skill in the art, and these changes and modifications are intended to be within the scope of the claims.

REFERENCE NUMERALS

100 Infusion Device
101 Case of infusion device 100
400 Drip chamber
410 Drop former of drip chamber 400
425 Fluid
500 Specialty valve apparatus
501 Specialty valve body of specialty valve apparatus 500
502 Valve housing of valve body 501
503 Flow body of valve body 501
504 In-flow end of flow body 503
505 Outflow end of flow body 503
506 Upper rotation-control member
507 Distal rotation-control member
508 Attachment body of valve body 501
509 Valve aperture
509a Valve attachment means of valve aperture 509
509b Valve attachment means of flow control portion 552
510 Upper flow pathway
510a First opening of upper flow pathway 510
510b Second opening of upper flow pathway 510
511 Distal flow pathway
511a First opening of distal flow pathway 511
511b Second opening of distal flow pathway 511
550 Specialty valve
551 Rotation-control portion of specialty valve 550
551a Distal surface of rotation-control portion 551
551b First space of rotation-control portion 551
551c Second space of rotation-control portion 551
552 Flow control portion of specialty valve 550
552a Outer surface of flow control portion 552
553 Rotation-control member of specialty valve 550
560 Medial flow pathway
560a Inner surface of medial flow pathway 560
561 First opening of medial flow pathway 560
561a First tapered groove of first opening 561
561b First groove end of first tapered groove 561a
561c First groove tip of first tapered groove 561a
561d First groove floor of first tapered groove 561a
561e First groove opening of first tapered groove 561a
562 Second opening of medial flow pathway 560
562a Second tapered groove of second opening 562
562b Second groove end of second tapered groove 562a
562c Second groove tip of second tapered groove 562a
562d Second groove floor of second tapered groove 562a
562e Second groove opening of second tapered groove 562a
563 V-shaped opening to inner surface 560a
564 V-shaped opening to inner surface 560a
600 Gearbox/Motor
W1 First width of first tapered groove 561a
W2 Second width of first tapered groove 561a

What is claimed is:

1. An improved stopcock valve for a low-pressure device, said improved stopcock valve comprising:

a valve body, said valve body having at least one inlet port and at least one outlet port, said valve body having a first through-bore in communication with said at least one inlet port and said at least one outlet port, said first through-bore having a first annular snap-fit therein; and, a rotatable interference body having a second through-bore therein, said rotatable interference body having an external surface, said second through-bore having a first opening to said surface and a second opening to said external surface, said external surface of said rotatable interference body having a second annular snap-fit thereon, said second annular snap-fit arranged to secure said rotatable interference body to said first annular snap-fit of said first through-bore of said valve body, said external surface including a first tapered groove in communication with said first opening and a second tapered groove in communication with said second opening, said first and second tapered grooves arranged to be in communication with said at least one inlet port and said at least one outlet port upon rotation of said rotatable interference body, each of said first tapered groove and said second tapered groove having a tip and an end defining a curved groove floor, said end having a V-shaped opening into an internal surface of said second through-bore where the curved groove floor of said end curves in a direction towards the respective opposite opening, wherein said rotatable interference body is arranged to be rotated to occlude fluid flow through said valve body or to adjustably regulate fluid flow through said valve body via said second through-bore.

2. The improved stopcock valve recited in claim 1, wherein said tip increases in width towards said end.

3. The improved stopcock valve recited in claim 1, wherein said rotatable interference body includes a rotation-control member, said improved stopcock valve having a pair of rotation-control members, wherein said rotation-control member of said rotatable interference body is arranged to move between said pair of rotation-control members of said improved stopcock valve.

4. The improved stopcock valve recited in claim 1, wherein said tip of said first and second tapered grooves increases in depth towards said end of said first and second tapered grooves.

5. An infusion device comprising the improved stopcock valve recited in claim 1.

6. An improved stopcock valve for a low-pressure device, comprising:
 a valve body having a proximal through-bore and a colinearly arranged distal through-bore, a medial through-bore in fluid communication with said proximal through-bore and said distal through-bore, said medial through-bore having an internal surface, said medial through-bore arranged perpendicularly and between said proximal through-bore and said distal through-bore; and,
 a rotatable interference body having:
  a rotation-control portion; and,
  a flow control portion extending from said rotation-control portion, said flow control portion having a through-bore therein, said through-bore having a first opening and a second opening, each of said first opening and said second opening extending into a tapered groove, said tapered groove having a tip and an end defining a curved groove floor, said end having a V-shaped opening into an internal surface of said though-bore where the curved groove floor of said end curves in a direction towards the respective opposite opening, said flow control portion arranged to be snap-fit within said medial through-bore of said valve body such that said rotatable interference body is rotatably secured within said medial through-bore and such that said internal surface of said medial through-bore substantially surrounds said flow control portion.

7. The improved stopcock valve for a low-pressure device recited in claim 6, wherein said rotatable interference body further comprises an external surface, said first opening and said second opening extending through said external surface.

8. The improved stopcock valve for a low-pressure device recited in claim 6, wherein said tapered grooves increase in width from said tip towards said end.

9. The improved stopcock valve for a low-pressure device recited in claim 8, wherein said tapered grooves increase in depth from said tip toward said end.

10. The improved stopcock valve for a low-pressure device recited in claim 6, wherein said rotatable interference body includes a rotation-control member, said valve body having a pair of rotation-control members, wherein said rotation-control member of said rotatable interference body is arranged to move between said pair of rotation-control members of said improved stopcock valve.

11. The improved stopcock valve for a low-pressure device recited in claim 10, wherein said rotation-control member includes at least one space, said at least one space arranged to engage a device for actuating said rotatable interference body.

12. The improved stopcock valve for a low pressure device recited in claim 6, wherein said first and second tapered grooves are arranged to be in communication with said proximal through-bore and said distal through-bore upon rotation of said rotatable interference body, wherein said rotatable interference body is arranged to be rotated to occlude fluid flow through said valve body or to adjustably regulate fluid flow through said valve body via said through-bore.

13. An infusion device comprising the improved stopcock valve recited in claim 12.

14. A rotatable interference body for a stopcock valve, comprising:
 a rotation-control portion; and,
 a flow control portion extending from said rotation-control portion, said flow control portion having a through-bore therein, said through-bore having a first opening and a second opening, each of said first opening and said second opening extending into a tapered groove, said tapered groove having a tip and an end defining a curved groove floor, said end having a V-shaped opening into an internal surface of said through-bore where the curved groove floor of said end curves in a direction towards the respective opposite opening.

15. The rotatable interference body for a stopcock valve recited in claim 14, further configured as at least one of:
 said tip increases in depth towards said end; and,
 said tip increases in width towards said end.

16. The rotatable interference body for a stopcock valve recited in claim 14, wherein a first arc angle of said curved groove floor has a greater depth than a second arc angle of said curved groove floor, where the first arc angle is arranged substantially within said V-shaped opening.

17. An improved stopcock valve, comprising:
 a valve body having a proximal through-bore and a colinearly arranged distal through-bore, a medial through-bore in fluid communication with said proximal through-bore and said distal through-bore, said medial through-bore having an internal surface, said medial through-bore arranged perpendicularly and between said proximal through-bore and said distal through-bore; and,
 the rotatable interference body recited in claim 14, said flow control portion arranged to be snap-fit within said medial through-bore of said valve body such that said rotatable interference body is rotatably secured within said medial through-bore.

18. The improved stopcock valve recited in claim 17, wherein said internal surface of said medial through-bore substantially surrounds said flow control portion.

19. An infusion device comprising the improved stopcock valve of claim 17.

* * * * *